Mar. 6, 1923.
E. J. MALONEY
FLOWERPOT SAUCER
Filed Sept. 19, 1919
1,447,801
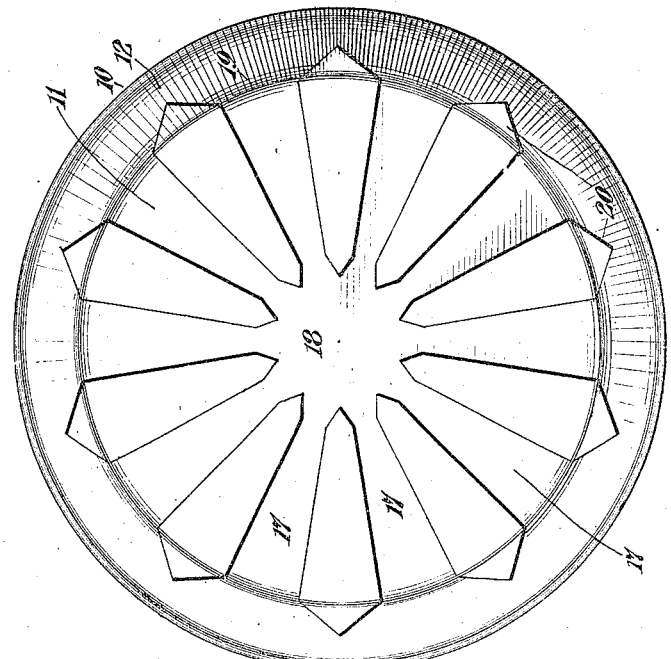
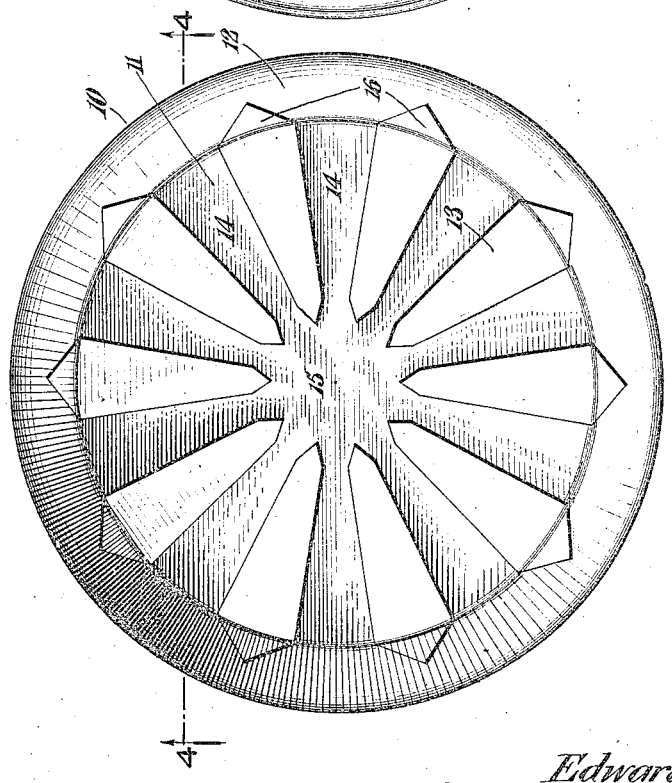
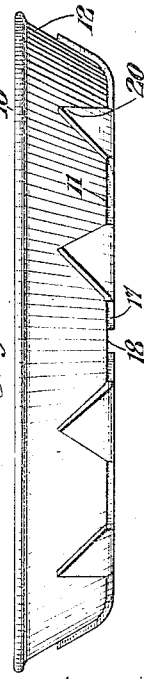
Inventor
Edward J. Maloney
By his Attorney Patented Mar. 6, 1923.

1,447,801

UNITED STATES PATENT OFFICE.

EDWARD J. MALONEY, OF LONG ISLAND CITY, NEW YORK, ASSIGNOR OF ONE-HALF TO EDWARD J. HESSION, OF NEW YORK, N. Y.

FLOWERPOT SAUCER.

Application filed September 19, 1919. Serial No. 324,732.

*To all whom it may concern:*

Be it known that I, EDWARD J. MALONEY, a citizen of the United States, and a resident of Long Island City, in the county of Queens and State of New York, have invented certain new and useful Improvements in Flowerpot Saucers, of which the following is a specification.

This invention relates to improvements in plates or saucers, such as are used in connection with plant or flower-pots.

It is a well-known fact that flower-pots, as ordinarily constructed, are provided with an opening in the bottom thereof for drainage purposes; and, in order to protect the surface of table tops, window ledges or the like, on which the flower-pots may be supported, saucers or plates are provided on which the flower-pots directly rest. It will be seen that the close contact made between the perimeter of the base of the flower-pot with the upper flat surface of the saucer has the effect of nullifying to a very considerable extent the function of the drainage opening referred to. The result is that the soil within the flower-pot has a tendency to become saturated with moisture even where drainage openings are provided, and to thus interfere with the proper growth of the plants therein. In addition to the difficulty pointed out, the porous nature of the material of which the saucers heretofore were composed gave rise to a tendency to cause the accumulation of moisture on the under side of the saucer, with the result that the surface of the table top or other object on which the saucer was supported was injuriously affected.

It is the object of the present invention to overcome the objection referred to, and to provide a plate or saucer in which the lower surface of the bottom of the flower-pot is ventilated and the soil in the lower portion of the flower-pot is aerated by the access thereto of a constant supply of air. It is a further object to provide a corresponding ventilation of the lower surface of the saucer to thereby overcome the tendency for moisture to accumulate in that situation.

With this and other objects in view, the invention consists mainly in the provision of a flower-pot saucer provided with means preventing the accumulation of moisture therein. The means by which I accomplish this beneficial result take the form of radially disposed passages formed in both the upper and the lower surfaces of the saucer element. Preferably, these grooves extend radially outward from a centrally disposed recess in the corresponding surface and, in order to accelerate in some degree the outward flow of moisture-laden air from the centrally disposed recesses referred to, the radial passages or grooves are formed with a progressively increasing width toward their outer extremities. Beneath the concave lower surface of the flower-pot and the upper surface of the saucer, raised ridges, which serve to form between them the radial passages referred to, are extended partially across the width of the flaring inner surface of the rim which is formed as a flange member on the outer edge of the saucer.

Other features of the invention will be hereinafter referred to.

The nature of the invention will be best understood when described in connection with the accompanying drawings, in which—

Fig. 1 is a top plan view of a flower-pot saucer embodying a portion of my invention.

Fig. 2 is a side elevation of the saucer shown in Fig. 1.

Fig. 3 is a plan view of the under side of the saucer shown in Fig. 1.

Fig. 4 is a vertical section taken in the direction of the arrows along the line 4—4 of Fig. 1.

Similar characters of reference designate corresponding parts thruout the several views.

In the drawings, I have shown the saucer 10 having a main body portion 11 formed with a slight elevation at its center so that there is a tendency for liquid disposed thereon to flow to the outer edge of the said portion 11 which forms the bottom or base of the saucer. The saucer is provided with an outwardly flaring rim member 12, as indicated; and the inner surface of the receptacle thus formed is provided with a series of radially extending elevated portions or ridges 13 which are spaced apart at uniform intervals to thereby provide a corresponding series of radially disposed passages 14, which extend from the central portion of the upper surface of the base or bottom 11 to points adjacent the extreme edge of the rim member 12. It will be seen that the ridges 13 terminate short of the central point of the base member so as to leave a space or recess 15 immediately surrounding the central point, which is clear of any elevation or obstruction which might interfere with the flow of moisture on the surface of the base member at that point. The ridge members 13 are brought to points at their inner extremities for the purpose of facilitating the entrance to the inner end of the passages 14 of any liquid that may have dropped from the opening in the flower-pot to the centrally disposed recess 15. For the purpose of increasing the tendency for such liquid to flow outwardly along the passages, the outer ends of the passages are arranged to be upon a slightly lower level than that of the central portion 15, as has been already indicated; and, in order in like manner to increase the tendency of moisture-laden air within the central portion 15 or in the passages to flow outwardly thru the passages, the passages are formed with an outwardly increasing width or area so that there is a factor of expansion in the outward flow, which has a certain tendency to increase or facilitate such flow. This feature is continued in the structural arrangement of the ridge members 13 in their extension as at 16 along the substantially vertical wall of the rim or flange member 12. The extended portion 16 of the ridge members 13 are, as indicated, formed with a converging formation so that they are in the form of points just as are found at the opposite inner ends of the ridge members. The effect is to carry out the idea of causing the intermediate grooves or passages 14 to progressively expand as they approach the extreme outer edge of the rim 12.

By the construction thus described, it will be seen that a flower-pot, resting upon the surface provided by the ridge members 13 formed on the inner surface of the saucer, will have the recess formed beneath its concave lower surface ventilated and aerated by a continual flow of air thru the passages provided by the grooves 14. The effect of this is to prevent the accumulation of moisture beneath the flower-pot and, in addition, to supply air to the soil within the lower portion of the flower-pot so as to overcome the tendency that would otherwise exist on the part of the soil to become saturated and soggy. Plant growth is thereby stimulated and the supply of water or other liquid to the surface of the soil from the flower-pot can be taken care of with a minimum amount of regulation, since any surplus moisture that is provided will be quickly carried off thru the aerating and ventilating features referred to.

Not only have I thus succeeded in providing useful ventilating and aerating means for the space beneath the bottom of the flower-pot, but I have also, in an analogous manner, provided for a similar ventilation for the lower surface of the bottom of the flower-pot saucer. I provide this ventilating means by the use of similar devices, that is, a series of grooves or passages 17 are formed in the lower surface of the bottom of the saucer, as indicated in Fig. 3 of the drawings. These grooves extend from the centrally disposed depression or recess 18 at the central portion of the surface to the outer peripheral line 19 of the base member, and partly up the outer side of the saucer rim, the ridges forming same ending in pointed portions 20. It will be seen that the radially disposed passages 17 will provide for the ventilation of the under surface of the saucer since they accomplish the access of air to this portion of the device and thus overcome the tendency for moisture to accumulate and injure the surface upon which the saucer rests.

It will be seen that I have provided a flower-pot saucer that has a very decided degree of utility. It is obvious that I need not confine myself to the precise form chosen for illustration, but that I may vary the embodiment in different ways and still maintain the predominating feature of the invention—which is to provide the flower-pot saucer with ventilating and aerating means.

The flower-pot saucer disclosed may be made of various materials, such as earthenware as in the case of flower-pot saucers ordinarily known and used, or I may make the device of metal or glazed vitreous material.

I claim:

A flower-pot saucer having a centrally disposed recess in its upper surface, and outwardly expanding radially extending drainage grooves extending from said centrally disposed recess to the rim of said saucer, said recess having a higher level than the level of the outer extremities of said grooves.

Signed at New York, in the county of Queens, and State of New York, this 28th day of August, A. D. 1919.

EDWARD J. MALONEY.